(No Model.)

F. GRINNELL.
PIPE FITTING.

No. 249,172. Patented Nov. 8, 1881.

WITNESSES:
J. A. Miller Jr
Wm. L. Cook

INVENTOR:
Frederick Grinnell
by Joseph A. Miller
atty

UNITED STATES PATENT OFFICE.

FREDERICK GRINNELL, OF PROVIDENCE, RHODE ISLAND.

PIPE-FITTING.

SPECIFICATION forming part of Letters Patent No. 249,172, dated November 8, 1881.

Application filed March 9, 1881. (No model.)

*To all whom it may concern:*

Be it known that I, FREDERICK GRINNELL, of the city and county of Providence and State of Rhode Island, have invented a new and useful Improvement in Pipe-Fittings; and I hereby declare the following to be a full, clear, and exact description of the same, reference being had to the accompanying drawings, forming part of this specification.

This invention has reference to an improvement in the fittings used to connect the pipes for distributing water through buildings for extinguishing fire or for other purposes.

When, in a system of fire-extinguishers, the pipes extending over a building are filled with water, the impurities in the water are liable to separate, and also, when the water contains impurities, the water is liable to carry the same to the sprinklers, and particularly in case of a fire, when the largest possible quantity is sent through the pipes, the impurities are carried to the sprinklers and are liable to close the whole or part of them, thus destroying their efficiency and endangering the building. In many manufactories it is also desirable to strain the water used for various purposes. The conditions most favorable for such straining are a slow flow of water and a large surface of perforated gauze. Such strainers cannot be placed into the pipes, as they would obstruct the flow of the water. As, however, the interior of the usual pipe-fittings—such as the branch T's, the elbows, and the cross-branches—are much larger than the interior of the pipes, and the flow of the water through the same is proportionately slower, the conditions for straining the same in these fittings are most favorable.

Figure 1:
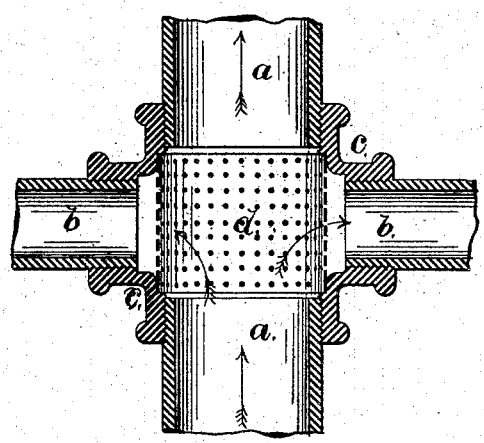
Figure 2:
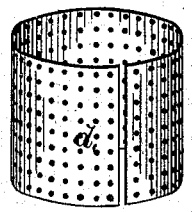
Figure 3:
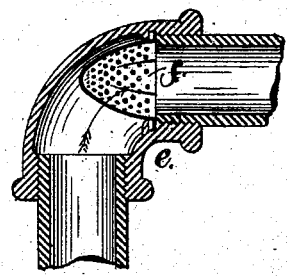
Figure 4:
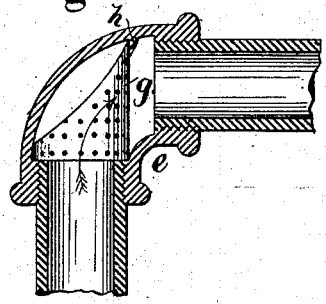
Figure 5:

Figure 1 is a sectional view of one of the usual cross-branches, in which two lateral outlets branch from the main pipe. This fitting is shown provided with a perforated strainer made of a band of perforated metal, bent as is shown in perspective in Fig. 2. Fig. 3 is a sectional view of the elbow-fitting, in which a perforated thimble is secured by means of the split flange being sprung into a groove in the fitting. Fig. 4 shows a nearly triangular piece of perforated sheet metal, bent as shown in Fig. 1, inserted into the elbow-fitting.

In the drawings, $a\ a$ are the main, and $b\ b$ the branch, pipes. $c$ is a cast-metal cross-branch fitting, and $d$ is a perforated strainer, as shown in Figs. 1 and 2. As the water flowing from the main to the branch pipes alone is strained, it will be seen that the whole width and the whole circumference of the strainer $d$ will form a very large area of strainer-surface. In a T-fitting (shown in Fig. 1) having only one lateral outlet the strainer will be inserted the same as those shown in Figs. 1 and 2.

$e\ e$ are elbow-fittings for making turns, and $f$ is the perforated thimble inserted to form a strainer.

$g$ is a bent sheet-metal strip, cut so as to fit into the elbow-fitting, where, after it is inserted, it can expand and rest on the flange $h$ cast into the fitting for this purpose.

The impurities can be more easily removed from the fittings than when the same accumulate in the pipes or in the sprinklers, as the fittings can be more easily removed.

By the use of pipe-fittings provided with strainers all the impurities are retained, particularly as the water in most cases will have to pass several strainers before it reaches the sprinklers, and therefore the efficiency of the strainers can be relied upon.

I am aware that strainers of various forms have been secured between the flanged ends of two adjoining lengths of pipe in pipe-lines, and to this arrangement I make no claim.

Having thus described my invention, I claim as new and desire to secure by Letters Patent—

As a new article of manufacture, a screw-threaded pipe-fitting containing a split strainer sprung into it, substantially as before set forth.

FREDERICK GRINNELL.

Witnesses:
J. A. MILLER, Jr.,
WM. L. COOP.